United States Patent [19]

Heymans et al.

[11] Patent Number: 5,002,431
[45] Date of Patent: Mar. 26, 1991

[54] METHOD OF FORMING A HORIZONTAL CONTAMINATION BARRIER

[75] Inventors: Michael J. Heymans, Highlands Ranch; Frederick W. Obernolte, Jr., Franktown, both of Colo.

[73] Assignee: Marathon Oil Company, Findlay, Ohio

[21] Appl. No.: 446,026

[22] Filed: Dec. 5, 1989

[51] Int. Cl.$^5$ .............................................. E02D 5/18
[52] U.S. Cl. .................................. 405/128; 405/263; 166/295
[58] Field of Search ............... 405/266, 267, 269, 270, 405/128, 263, 264, 129; 166/295

[56] References Cited

U.S. PATENT DOCUMENTS

| | | | |
|---|---|---|---|
| 464,771 | 12/1891 | Harris | 405/266 |
| 528,367 | 10/1894 | Harris | 405/266 X |
| 1,430,306 | 9/1922 | Francois | 405/266 |
| 3,094,846 | 6/1963 | Peeler, Jr. | 61/36 |
| 3,705,627 | 12/1972 | Argabright et al. | 166/295 |
| 3,915,727 | 10/1975 | Sparlin et al. | 106/123 |
| 4,072,194 | 7/1978 | Cole et al. | 166/295 |
| 4,084,382 | 4/1978 | Clem | 61/36 R |
| 4,452,551 | 6/1984 | Arndt et al. | 405/266 X |
| 4,491,369 | 1/1985 | Cleary | 299/19 |
| 4,540,316 | 9/1985 | Takahashi | 405/264 |
| 4,615,643 | 10/1986 | Gouvenot | 405/128 |
| 4,637,462 | 1/1987 | Grable | 166/245 |
| 4,645,382 | 2/1987 | Burkhardt et al. | 405/264 |
| 4,664,809 | 5/1987 | Fenton et al. | 210/663 |
| 4,669,920 | 6/1987 | Dymond | 405/264 |
| 4,683,949 | 8/1987 | Sydansk et al. | 166/270 |
| 4,697,953 | 10/1987 | Nussbaumer et al. | 405/128 |
| 4,705,431 | 11/1987 | Gadelle et al. | 405/267 |
| 4,759,665 | 7/1988 | Burkhardt et al. | 405/264 |

FOREIGN PATENT DOCUMENTS 8170592 10/1983 Japan .
1076533 2/1984 U.S.S.R. .

*Primary Examiner*—Dennis L. Taylor
*Attorney, Agent, or Firm*—Jack L. Hummel; Jack E. Ebel

[57] ABSTRACT

A method of forming a lateral barrier to downward flow of fluid contaminants through a porous subterranean formation. A fluid medium capable of maturing into an impermeable material over a period of time, such as an aqueous composition capable of forming a gel or an aqueous slurry of portland cement, is injected into the formation at a pressure greater than the overburden pressure, lifting formations located above the level of injection, thereby creating a laterally extending void filled with the fluid medium. The lateral extent of travel of the fluid medium is monitored by utilizing tiltmeter technology. The fluid medium subsequently hardens into an impermeable barrier to downward fluid contaminant flow.

10 Claims, 2 Drawing Sheets

5,002,431

METHOD OF FORMING A HORIZONTAL CONTAMINATION BARRIER

FIELD OF THE INVENTION

This invention relates to a method for preventing contaminants from waste storage areas or spill sites from entering aquifers or water supplies. More particularly, it relates to a method of isolating the waste material by forming a horizontal barrier to ythe downward flow of liquid contaminants to prevent their travel or percolation through a porous subterranean formation.

BACKGROUND OF THE INVENTION

One of the major environmental problems of today is to preserve potable water supplies from contamination. This is particularly difficult in areas near waste disposal or spill sites where the waste materials often eventually find their way into aquifers or areas of water storage. This will normally come about by the percolation of aqueous or nonaqueous liquid contaminants through permeable soil directly into the acquifer or water supply.

One way to prevent contaminants from entering aquifers or water supplies is to line the bottom of a proposed waste storage site with an impermeable liner prior to use of the site. This requires excavation of the area down to the design depth of the site and the placement of such a liner, which may comprise any suitable barrier such as a flexible plastic liner or a cement base. The labor involved in such an operation, however, can be quite time consuming and expensive. Moreover, this approach does not solve the problem of contamination from existing waste storage sites which were not originally provided with liners. Nor does it solve the problem of preventing the leakage of pollutants from existing storage tanks, for example, gasoline storage tanks used at service stations, from eventually entering our our water supplies.

It has been suggested to erect barriers to the migration of contaminants through the soil by injecting a liquid sealant into the soil to both move the earth and provide a seal against the flow of fluids. In U.S. Pat. No. 4,491,369, for example, a method of upwardly displacing an entire massive earth block for the purpose of sealing the perimeter and lower face of the block is disclosed. Vertical trenches are dug corresponding to the perimeter of the block to be lifted and sealed, and the trenches are then sealed so that the amount of pressure required to lift the block by the injection of a low solids content slurry at the base of the block can be minimized. The horizontal extent of the layer which seals the lower face of the block is thus required to be established by the trench layout. The entire operation of trenching and sealing the vertical and horizontal boundaries of the massive earth block requires a great deal of labor and is too time consuming and costly for many waste disposal sites.

Another approach to isolating and controlling underground liquids is found in U.S. Pat. No. 4,637,462 which discloses the use of a nunmber of injection wells from which an expansive slurry, such as bentonite, is injected into the surrounding formation to seal the area around a length of the well. By following this procedure with a number of injection wells located around the periphery of the site, a peripheral vertical boundary to the flow of fluids into and out of the area is created. To isolate the bottom of the site, the use of separate slant injection wells is suggested.

The use of injected material to form vertical seals at the periphery of a zone and at the bottom of the zone is also suggested in U.S. Pat. No. 4,645,382, using injection methods which are described in the patent as being established techniques.

Since the prior art methods of isolating waste material from ground water supplies appear to be either highly specialized or too costly and time consuming to be used in connection with many waste disposal sites, it is a main object of the invention to provide a swift, inexpensive method for isolating a contamination site at any relative shallow predetermined depth without having to embark on an involved, expensive operation, and to be able to do so in a relatively short period of time.

SUMMARY OF THE INVENTION

In accordance with the invention a fluid medium capable of setting or maturing over a period of time to form a material impermeable to fluids is injected into a porous formation at a predetermined depth below a source of present or potential contamination. The fluid medium is injected at a pressure greater than the pressure of the overburden so as to move the adjacent overburden formation upwardly to create a generally horizontally extending void filled with the fluid medium. The lateral extent of flow of the fluid medium is determined and the injection of the fluid medium is ceased when the flow has reached a predetermined limit. The fluid medium is then allowed to set or become too viscous to flow so as to form an impermeable barrier to downward flow of fluid contaminants.

The adjacent overburden formation is moved upwardly by the pressure of the fluid medium by both compressing unconsolidated formations located above the level of injection and lifting the formations located above the level of injection. The lateral extent of the flow of the fluid medium is monitored by surface probes extending into the ground which are capable of detecting slight earth movement. When the probes corresponding to the desired perimeter of the barrier indicate that the injected fluid medium has reached that point in its lateral travel, the injection operation can be halted and the fluid medium permitted to set or mature into a fluid impermeable layer. The probes preferably are electronic tiltmeters capable of detecting very slight earth movements resulting from the fluid injection process.

Although the fluid medium may be any fluid composition capable of setting or maturing into a fluid impermeable layer, a preferred material from the standpoint of cost, performance and ease of mixing and injecting is a gelation solution capable of maturing into a stable nonflowable gel, such as a carboxylate-containing polymer crosslinked with a chromic carboxylate complex crosslinking agent.

Other features and aspects of the invention, as well as other benefits thereof, will readily be ascertained from the more detailed description of the invention which follows.

DETAILED DESCRIPTION OF THE PREFERRED EMBODIMENT

Figure 1:
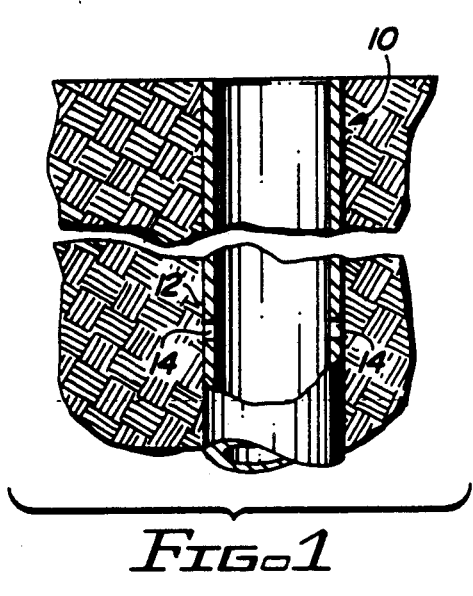
FIG. 1 is a partial schematic vertical sectional view of an injection well used in carrying out the method of the present invention.

Referring to FIG. 1, the invention is carried out by providing an injection well 10 extending through the formation overlying the area to be protected, the well comprising the usual casing 12 which may be cemented in place as necessary. Perforations 14 through which a fluid medium may be injected into the surrounding formation are provided in the casing by conventional means at a depth corresponding to the design depth of the desired fluid contaminant barrier.

As used in the specification and claims the term "fluid contaminant" is intended to mean aqueous and nonaqueous liquid pollutants, as well as liquid solutions of solid pollutants, which are capable of flowing or percolating through porous formations down into the ground water. The term "fluid medium" is intended to mean a liquid solution containing a substance which eventually forms an impermeable barrier to the flow of fluid contaminants.

To create the fluid contaminant barrier, the fluid medium is injected through the perforations 14, which are located around the periphery of the casing and which permit a radially outward flow of the fluid medium from the casing. The perforations are located at a relatively shallow depth, preferably less than 1000 feet, in a porous or unconsolidated formation so that due to the relatively low parting pressure the formation will fracture generally horizontally rather than vertically. To cause the horizontal fracture, the pressure at which the fluid medium is injected into the formation must be greater than the pressure of the overburden at that point. The overburden pressure can be estimated according to the general formula which provides that for a loose or unconsolidated formation the pressure at a particular depth is approximately equal to one pound per square inch multiplied by the depth in feet. Preferably, the injection pressure would be greater than the calculated overburden pressure by a suitable margin of safety, for example, 20%, to ensure that the pressure of the injected fluid medium will cause the formation to fracture horizontally.

The fluid medium may be any substance in solution which becomes an impermeable membrane or barrier to the flow of a fluid contaminant. A preferred substance due to its ready availability, its economy and its ability to form an impermeable barrier to liquid flow is a suitable gel composition which can be pumped as a liquid and which subsequently crosslinks in place to form a mature nonflowable, impermeable gel having sufficient strength to withstand the pressures exerted on it while in place in the formation. Gels of particular interest in this regard are gels comprised of a carboxylate-containing polymer crosslinked with a crosslinking agent comprising a chromic carboxylate complex.

The carboxylate-containing polymer may be any crosslinkable, high molecular weight, water soluble, synthetic polymer or biopolymer containing one or more carboxylate species. The average molecular weight of the carboxylate-containing polymer is in the range of about 10,000 to about 50,000,000, with the preferred range being about 100,000 to about 20,000,000.

The biopolymers which can be used include polysaccharides and modified polysaccharides. Exemplary biopolymers are guar gum and carboxymethylcellulose. Exemplary synthetic polymers include acrylamide polymers, such as polyacrylamide, partially hydrolyzed polyacrylamide and terpolymers containing acrylamide, acrylate and a third species. As defined herein, polyacrylamide is an acrylamide polymer having substantially less than 1% of the acrylamide groups in the form of carboxylate groups. Partially hydrolyzed polyacrylamide is an acrylamide polymer having at least 1%, but not 100%, of the acrylamide groups in the form of carboxylate groups. The acrylamide polymer may be prepared according to any of the well known conventional methods in the art. The preferred carboxylate-containing polymer is polyacrylamide or partially hydrolyzed polyacrylamide.

With respect to the chromic carboxylate complex crosslinking agent, the term "complex" means an ion or molecule containing two or more interassociated ionic, radical or molecular species. A complex ion as whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The complex useful as a crosslinking agent includes at least one or more electropositive chromium III species and one or more electronegative carboxylate species. Each complex optionally contains additional species which are not essential to the polymer crosslinking function of the complex, such as one or more water molecules or inorganic monovalent or divalent ions which function merely to balance the electrical charge of the complex.

Trivalent chromium and chromic ion are equivalent terms encompassed by the term "chromium III species" as used herein. The carboxylate species are advantageously derived from water soluble salts of carboxylic acids, especially low molecular weight mono-basic acids. Carboxylate species derived from salts of formic, acetic, propionic and lactic acid, lower substituted derivatives thereof and mixtures thereof are preferred. The carboxylate species include formate, acetate, propianate, lactate, lower substituted derivatives thereof and mixtures thereof, all of which are water soluble. The optional organic ions include sodium, sulfate, nitrate and chloride ions.

The complexes described and their method of preparation are well known in the gelling art and do not require further detailed discussion.

If it is found that the preferred gels are susceptible to attack by the particular contaminant of concern, it may be necessary to employ a barrier of a different nature the structure of which is not affected by the contaminant. One such example is an aqueous slurry of portland cement which eventually will set into an impermeable layer. Other examples include slurries of casing cement, epoxy, bentonite and plastic foam.

Figure 2:
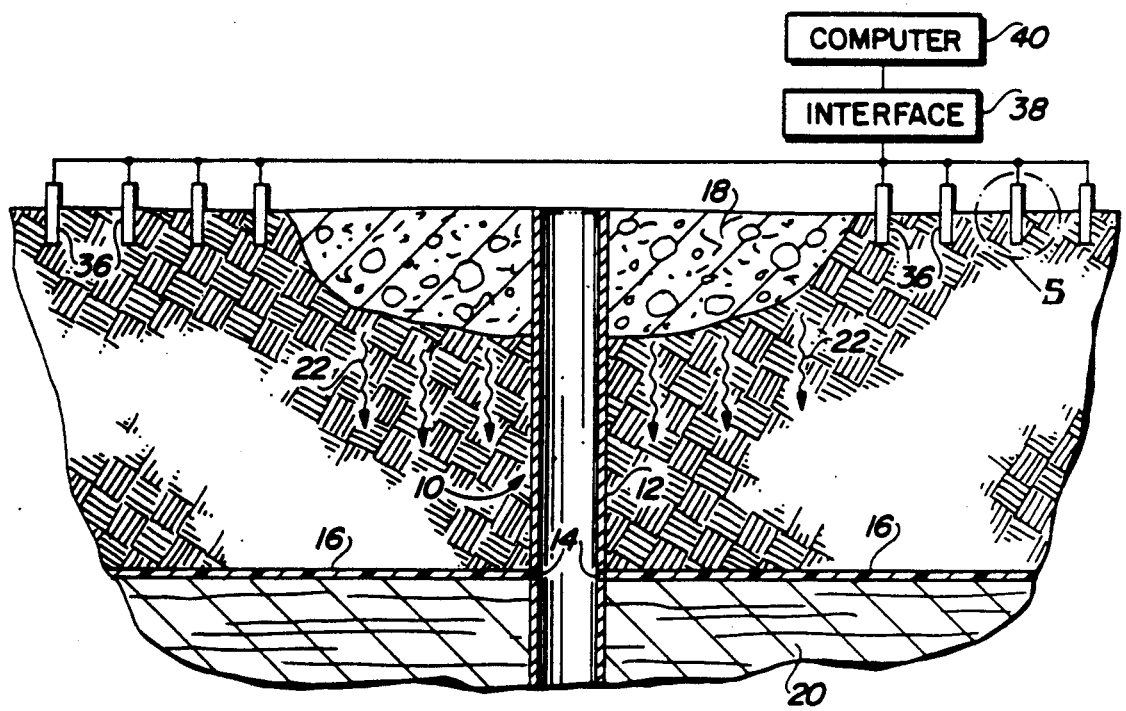
FIG. 2 is a schematic vertical sectional view of a centrally located injection well, showing the full extent of the horizontal barrier resulting from the injection operation.

Referring now to FIG. 2 of the drawing, an impermeable barrier 16 has been formed at a point beneath an existing or proposed waste disposal area or spill site 18 and above the groundwater formation 20 to be protected by the introduction of a suitable fluid medium through the injection well 10. The area of concern in this case is relatively small, enabling a single centrally located injection well to be employed, with spaced perforations in the well casing providing for the radial travel of an injected fluid medium. This arrangement could be used only in connection with a rather small source of contaminants since the lateral spread of the fluid medium from an injection point would be expected to have a limited range, perhaps in the order of about 100 to 150 feet. The lateral dimension of the barrier must of course be great enough to ensure that the barrier will be present wherever downward flow of the fluid contaminant, as illustrated by the arrows 22, takes place. It is therefore necessary to monitor the spread of the fluid medium in order to know when to terminate the injection operation. The monitoring operation ideally should be capable of rapid feedback of the lateral spread of the fluid medium so that the extent of the injection operation can be readily controlled.

Figure 3:
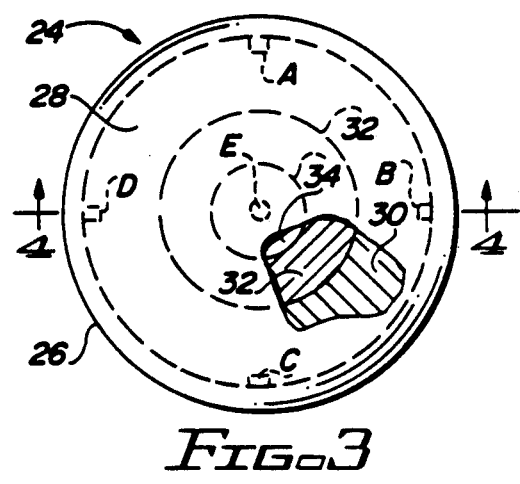
FIG. 3 is a schematic plan view of a tiltmeter sensor which may be used in the method of the invention.
Figure 4:
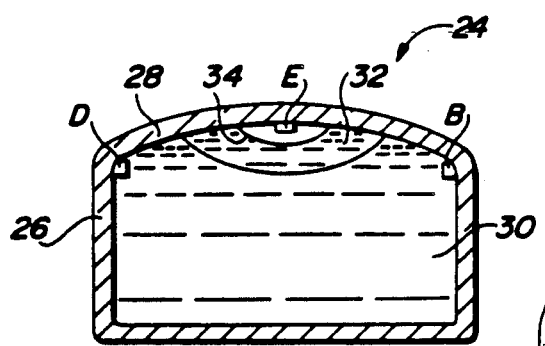
FIG. 4 is a schematic vertical sectional view taken on line 4—4 of FIG. 3.

The monitoring method best suited for this purpose makes use of extremely sensitive electronic tiltmeters, which measures the deformation of the earth as the earth elastically responds to the opening of a hydraulic fracture. As shown in FIGS. 3 and 4, these instruments include a sensor 24 comprising a container 26 which has a curved surface 28 and which is filled with two liquids 30 and 32 having different electrical properties. A small bubble 34 of fluid in the container 26 functions as a bubble level. When the sensor is tilted the positions of the liquids 30 and 32, both with respect to each other and with respect to electrical contacts A,B,C,D and E in the container, will change due to the changing position of the bubble 34. By measuring the resistance changes at the contacts, which are proportional to the tilt of the instrument 24, the tilt change can be determined along two directions, resulting in a vector having direction, magnitude and sense. To obtain the vector the tilt data must be analyzed to separate out local, regional, solid earth tidal, meterological and planetary noise. Suitable computer programs which take all these factors into account can be used to give virtually instant tilt readings based on tiltmeter input sent to the computer. Tiltmeter technology is known in the industry and is commercially available. Hunter Geophysics of Mountain View, Calif., for example, supplies electronic tiltmeters which function according to the principles described above. Such tiltmeters are capable of detecting minute tilt changes in the order of 0.005 microradians and are well suited for monitoring the horizontal hydraulic fracturing that takes place when introducing a fluid medium into a formation.

Referring back to FIG. 2, a number of tiltmeter installations 36 are shown as being arranged in an array and connected to suitable interface equipment 38 capable of receiving signals from the tiltmeters and transmitting them to a computer 40. The computer 40 will be programmed to indicate the lateral extent of the barrier 16. Although only one array of monitoring devices is shown, it will be understood that a number of arrays may be set out so that the spread of the fluid medium radially from the injection well can be monitored.

Figure 5:
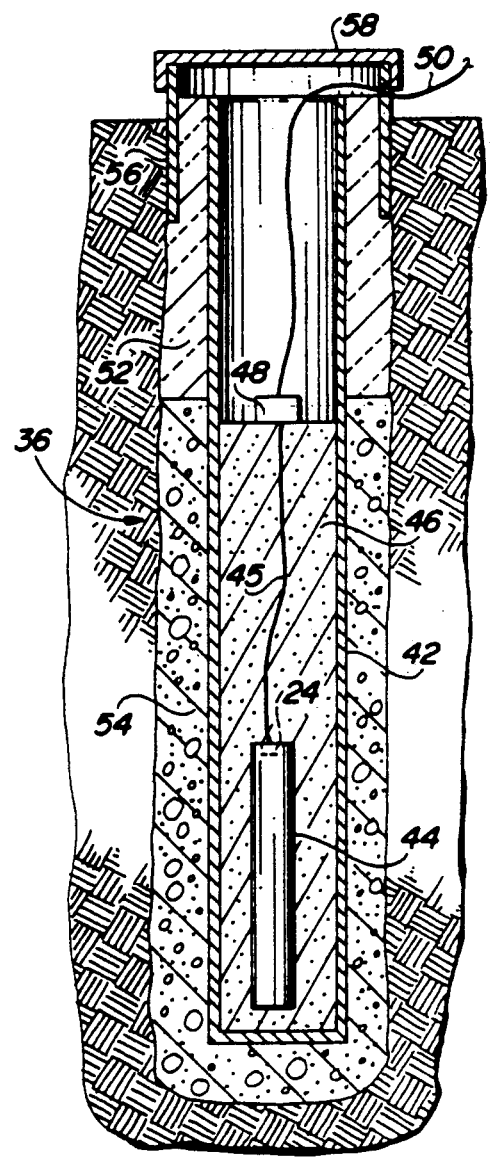
FIG. 5 is a schematic vertical sectional view of a typical tiltmeter installation.

As shown in FIG. 5, a typical tiltmeter installation 36 may comprise a casing 42 which holds a tiltmeter 44 mounted in sand 46. The tiltmeter 44 is electrically connected through wire 45 to electronic circuits 48 which in turn are connected through wire 50 to the computer interface 38 of FIG. 2. The upper portion of the annular space between the casing 42 and the earth is filled with thermal insulation 52, with the remainder being filled with cement 54. A short outer casing 56 spaced from the inner casing 42 extends above the surface and is topped by a protective cap or seal 58. The tiltmeter itself is only about three feet long and the casings will extend from ten to twenty feet beneath the surface. This arrangement provides for adeqate coupling to the earth. It will be understood that detailed tiltmeter mounting means are not shown since such details form no part of the invention and are available from tiltmeter suppliers.

As indicated previously, the parting pressure caused by the injection of the fluid medium may cause some compression of the unconsolidated formations above the medium, but it will mainly cause lifting of the formations. Because the tiltmeters will detect earth deformations resulting from only slight horizontal hydraulic fracturing, the thickness of the layer of injected fluid medium need be only as thick as is necessary to provide an impenetrable barrier to the flow of fluid contaminants. The thickness of the fluid medium as a result of exceeding the parting pressure of the formation may therefore be quite low, in the order of 1 to 2 centimeters, and may be even lower, down to a few millimeters, as long as the resulting barrier functions as required.

Figure 7:
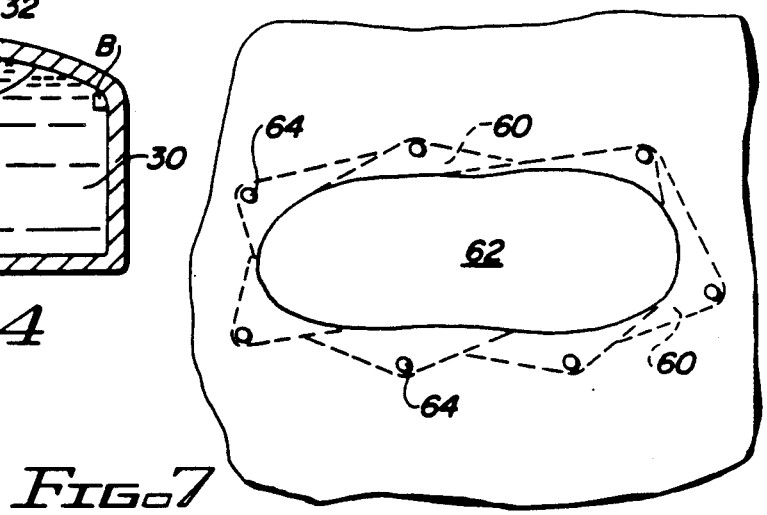
FIG. 7 is a plan view of the layout of FIG. 6.
Figure 6:
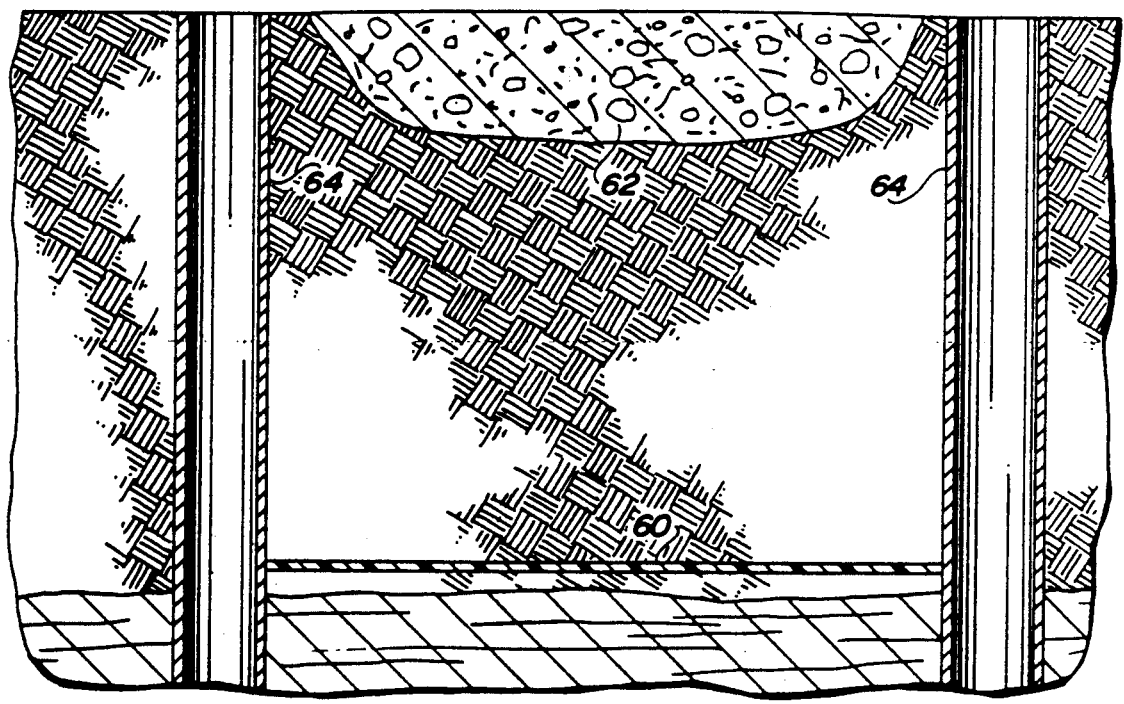
FIG. 6 is a vertical sectional view similar to that of FIG. 2, but showing the use of periphery injection wells to establish the full extent of the horizontal barrier resulting from the injection operation.

Referring to FIGS. 6 and 7, a similar method may be employed to provide a barrier 60 beneath a relatively large waste disposal area 62 through the use of a number of injection wells 64 located around the periphery of the area. By locating the perforations in the well casings so as to direct the fluid medium in the general direction of the waste area 62 at the same depth, the fluid medium from the different injection wells 64 will interconnect with each other and form a large continuous barrier 60. Monitoring of the spread of the fluid medium from each of the injection wells in this case would be possible through suitable arrays of tiltmeters, not shown, connected to a computer in a manner generally as previously described.

It should now be appreciated that the present invention provides a simple method of preventing the flow of contaminants into ground water which can be expected to be both economical to install and effective in performance. It can be employed not only to isolate new waste disposal sites from ground water, but is uniquely suited to isolate existing sites from the ground water. Further, the barrier resulting from the invention can, if desired, also be installed directly in an aquifer to reduce or contain the further spread of contaminants within the aquifer. In addition, the invention can be utilized to provide a barrier beneath quite small storage tanks to prevent probable future leakage from the tank from entering the ground water. In connection with large spills or very mobile liquids, the invention can be used in conjunction with draw-down or skimmer pumps to assist in the containment of the liquids.

Although described in connection with providing only horizontal barriers to the flow of contaminants, it will be understood that vertical barriers or curtains formed by any suitable means may also be provided if desired to form an enclosed barrier structure.

It will further be understood that changes to the method of the invention which do not affect the overall basic function and concept thereof may be made without departing from the spirit and scope of the invention, as defined in the appended claims.

What is claimed is:

1. A method of forming a barrier against downward flow of fluid contaminants through a subterranean porous formation, comprising the steps of:

injecting into the porous formation at a predetermined depth a fluid medium capable of forming a fluid-impermeable material over a period of time;

the fluid medium being injected at a pressure greater than the pressure of the overburden to cause the formation to fracture generally horizontally and to move the adjacent overburden formation upwardly, thereby creating a laterally extending void filled with the fluid medium;

determining the lateral extent of upward movement of the overburden and thus the lateral extent of the flow of the fluid medium into the void created by said upward movement of the overburden;

casing to inject the fluid medium when the lateral extent of the fluid medium flow has reached a predetermined limit; and allowing the fluid medium in the laterally extending void to form an impermeable barrier to downward flow of fluid contaminants.

2. The method of claim 1, wherein the fluid medium is injected at a depth less than about 1000 feet.

3. The method of claim 1, wherein the fluid medium comprises an aqueous slurry selected from the group consisting essentially of portland cement, well casing cement, epoxy, bentonite and plastic foam.

4. The method of claim 1, wherein the fluid medium comprises a liquid composition capable of gelling to form a gel comprising a carboxylate-containing polymer crosslinked with a chromic carboxylate complex crosslinking agent.

5. The method of claim 4, wherein the polymer is an acrylamide polymer.

6. The method of claim 5, wherein the polymer is a polymer selected from the group consisting of polyacrylamide and partially hydrolyzed polyacrylamide, and the crosslinking agent is a chromic acetate complex.

7. The method of claim 1, wherein the lateral extent of the upward movement of the overburden is determined by monitoring the movement of the earth by means of an electronic tiltmeter.

8. The method of claim 7, wherein a plurality of tiltmeters are connected to a computer programmed to reflect the signal from each tiltmeter in terms of the deformation of the earth at each tiltmeter location.

9. A method of forming a barrier against downward flow of fluid contaminants through a subterranean porous formation, comprising the steps of:

forming a cased injection well;

providing one or more perforations in the casing of the well at a predetermined depth;

injecting a fluid medium through the perforations and into the porous formation, the fluid medium being capable of maturing to a nonflowable condition over a period of time;

the fluid medium being injected at a pressure greater than the pressure of the overburden so as to move the adjacent overburden formation upwardly to create a laterally extending void filled with the fluid medium;

determining the lateral extent of flow of the fluid medium by monitoring the deformation of the earth by means of an electronic tiltmeter;

ceasing to inject the fluid medium when the lateral extent of the fluid medium flow has reached a predetermined point; and allowing the fluid medium in the laterally extending void to mature into nonflowable condition to form an impermeable barrier to downward flow of the fluid contaminant.

10. The method of claim 9, wherein the fluid medium is injected at a depth less than 1000 feet.

* * * * *

UNITED STATES PATENT AND TRADEMARK OFFICE
CERTIFICATE OF CORRECTION

PATENT NO. : 5,002,431
DATED : March 26, 1991
INVENTOR(S) : Michael J. Heymans et al.

It is certified that error appears in the above-identified patent and that said Letters Patent is hereby corrected as shown below:

| | |
|---|---|
| Col. 1, line 10: | Delete "ythe" and insert therefor --the--. |
| Col. 1, line 39: | Delete "our". |
| Col. 1, line 62: | Delete "nunmber" and insert therefor --number--. |
| Col. 2, line 14: | Delete "relative" and insert therefor --relatively--. |
| Col. 3, line 10: | Delete "periphery" and insert therefor --peripheral--. |
| Col. 4, line 31: | After "as", insert --a--. |
| Col. 5, line 46: | Delete "meterological" and insert therefor --meteorological--. |
| Col. 6, line 14: | Delete "adeqate" and insert therefor --adequate--. |
| Col. 7, line 25: | Delete "casing" and insert therefor --ceasing--. |

Signed and Sealed this

Fifteenth Day of September, 1992

Attest:

DOUGLAS B. COMER

*Attesting Officer*   *Acting Commissioner of Patents and Trademarks*